US010129469B2

(12) United States Patent
Silva et al.

(10) Patent No.: US 10,129,469 B2
(45) Date of Patent: Nov. 13, 2018

(54) PASSIVE INFRARED SEARCH AND TRACK SENSOR SYSTEM

(71) Applicant: BAE SYSTEMS INFORMATION AND ELECTRONIC SYSTEMS INTEGRATION INC., Nashua, NH (US)

(72) Inventors: Raymond J. Silva, Saugus, MA (US); Gerard M. Perron, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 730 days.

(21) Appl. No.: 14/201,045

(22) Filed: Mar. 7, 2014

(65) Prior Publication Data

US 2016/0142631 A1    May 19, 2016

Related U.S. Application Data

(60) Provisional application No. 61/853,088, filed on Mar. 27, 2013.

(51) Int. Cl.
| | |
|---|---|
| *H01J 3/14* | (2006.01) |
| *H04N 5/232* | (2006.01) |
| *G02B 13/22* | (2006.01) |
| *G02B 13/00* | (2006.01) |
| *G02B 7/02* | (2006.01) |
| *G02B 13/06* | (2006.01) |
| *H04N 5/33* | (2006.01) |
| *H04N 5/247* | (2006.01) |
| *H04N 5/225* | (2006.01) |

(52) U.S. Cl.
CPC ......... *H04N 5/23238* (2013.01); *G02B 7/028* (2013.01); *G02B 13/0095* (2013.01); *G02B 13/06* (2013.01); *G02B 13/22* (2013.01); *H04N 5/2258* (2013.01); *H04N 5/247* (2013.01); *H04N 5/33* (2013.01); *H04N 5/332* (2013.01)

(58) Field of Classification Search
USPC ....................................................... 348/144
See application file for complete search history.

(56) References Cited

U.S. PATENT DOCUMENTS

| | | | | | |
|---|---|---|---|---|---|
| 4,783,593 | A | * | 11/1988 | Noble ..................... | G01J 5/061 250/332 |
| 4,827,130 | A | * | 5/1989 | Reno ...................... | G01J 5/061 250/332 |
| 4,994,670 | A | * | 2/1991 | Noble ................... | H04N 5/2253 250/235 |

(Continued)

*Primary Examiner* — Jessica M Prince
*Assistant Examiner* — Patrick E Demosky
(74) *Attorney, Agent, or Firm* — Antony P. Ng; Russell Ng PLLC (57) ABSTRACT

A surveillance sensor system is described. The surveillance sensor system includes a polygonal-shaped assembly having four substantially identical quadrant segments. Each of the quadrant segments includes a first set of lens, a second set of lens, and a third set of lens. Images captured by the first, second and third sets of lens can be combined to form a telecentric image on an intermediate image plane. The surveillance sensor system also includes a relay optic module having a set of lens, multiple focal plane array detectors and a dewar. The relay optic module can re-image the telecentric image located on the intermediate image plane onto an image plane.

11 Claims, 6 Drawing Sheets

(56) References Cited

U.S. PATENT DOCUMENTS

| | | | | |
|---|---|---|---|---|
| 5,140,459 A | * | 8/1992 | Sagan | G02B 17/008 359/364 |
| 5,663,825 A | * | 9/1997 | Amon | G02B 26/0875 250/230 |
| 6,172,813 B1 | * | 1/2001 | Tadic-Galeb | G02B 13/16 359/618 |
| 7,176,960 B1 | * | 2/2007 | Nayar | G06T 3/4038 348/207.99 |
| 2003/0007254 A1 | * | 1/2003 | Tocci | G02B 27/1013 359/663 |
| 2011/0074983 A1 | * | 3/2011 | Bush | G03B 39/06 348/241 |
| 2011/0164108 A1 | * | 7/2011 | Bates | H04N 5/225 348/36 |

* cited by examiner

PASSIVE INFRARED SEARCH AND TRACK SENSOR SYSTEM

PRIORITY CLAIM

The present application claims priority under 35 U.S.C. § 119(e)(1) to provisional application No. 61/853,088, filed on Mar. 27, 2013, the contents of which are incorporated herein by reference.

BACKGROUND OF THE INVENTION

1. Technical Field

The present invention relates to surveillance sensor systems in general, and in particular to a passive infrared search and track sensor system for surveillance applications.

2. Description of Related Art

Because many unmanned aerial systems (UASs) are highly mobile and may have minimal thermal signatures, the detection and identification of UAS threats present a major challenge for conventional infrared search and track sensor systems. This is because conventional infrared search and track sensor systems typically rely on scanning optics and relatively small time delay integration (TDI) arrays for coverage at the expense of the other performance parameters.

Consequently, it would be desirable to provide an improved infrared search and track sensor system.

SUMMARY OF THE INVENTION

In accordance with a preferred embodiment of the present invention, a surveillance sensor system includes a polygonal-shaped assembly having four substantially identical quadrant segments. Each of the quadrant segments includes a first set of lens, a second set of lens, and a third set of lens. Images captured by the first, second and third sets of lens can be combined to form a telecentric image on an intermediate image plane. The surveillance sensor system also includes a relay optic module having a set of lens, multiple focal plane array detectors and a dewar. The relay optic module can re-image the telecentric image located on the intermediate image plane onto an image plane.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
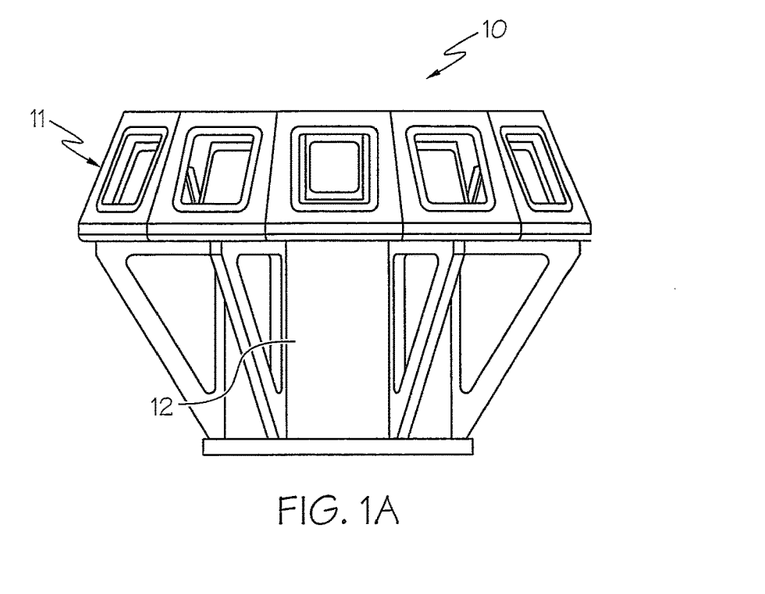
FIGS. 1A-1C are various views of a search and track sensor system, in accordance with a preferred embodiment of the present invention.
Figure 1B:
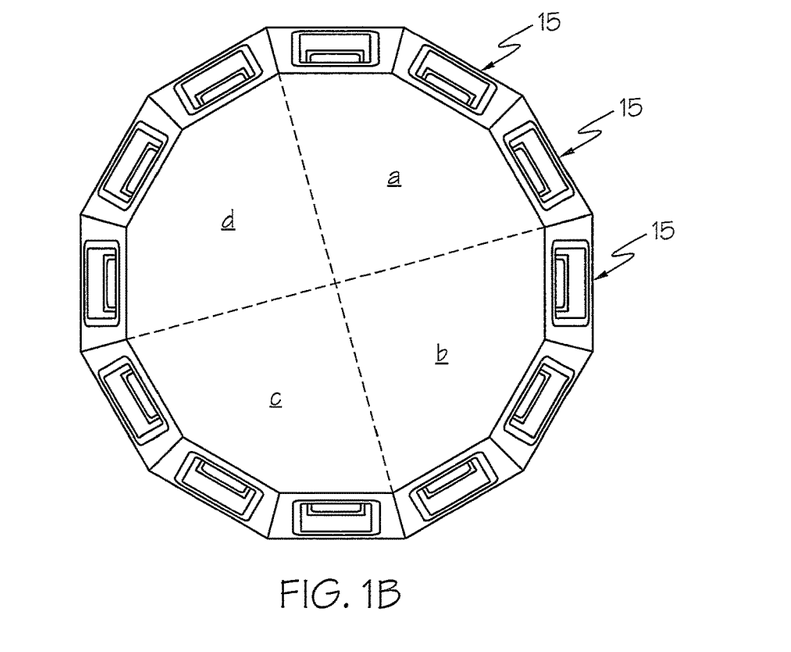
Figure 1C:
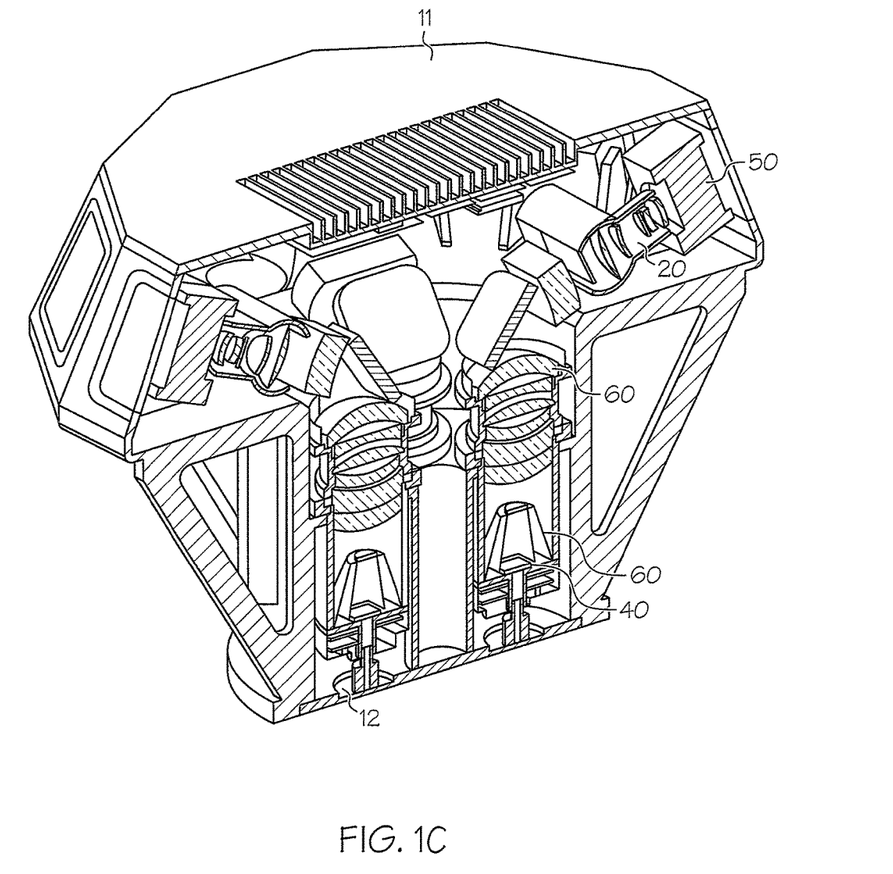

Referring now to the drawings and in particular to FIGS. 1A-1C, there are illustrated a side view, a top view and an isometric cross-sectional view of a ground-based infrared (IR) search and track sensor system, in accordance with a preferred embodiment of the present invention. As shown in FIG. 1A, a search and track sensor system 10 includes a polygonal-shaped assembly 11 supported by a cylindrical base 12. Preferably, the diameter and height of polygonal-shaped assembly 11 is approximately 29 inches and 9 inches, respectively, and the diameter and height of cylindrical base 12 is approximately 19 inches and 15 inches, respectively. Polygonal-shaped assembly 11 includes a total of twelve windows 15 located all around its perimeter, as shown in FIG. 1B. Each of windows 15 is angled 30° apart from each other. With windows 15 located all around the perimeter of polygonal-shaped assembly 11, search and track sensor system 10 can provide multiple low-distortion IR images with 360° azimuth by 60° elevation angle coverage. Search and track sensor system 10 can also provide a 133 µr instantaneous field-of-view (FOV) with low-distortion over the entire FOV at a frame rate of 5 Hz. The above-mentioned resolution and frame rate are sufficient to detect and track personnel and small unmanned aerial vehicles at several kilometers over the full FOV. Frame rates higher than 5 Hz can be achieved by using a faster optical toggle mechanism and focal plane array (FPA) detectors.

Search and track sensor system 10 are preferably made up of four identical quadrant segments a-d with each quadrant segment being responsible for providing a 90°×60° FOV, as shown in FIG. 1B. Specifically, each of four quadrant segments a-d includes an identical IR camera to provide a 90° horizontal by 60° vertical FOV coverage. The four IR cameras are oriented 90° relative to each other in order to provide the full azimuthal coverage with sufficient overlap between cameras. Distortions normally associated with wide-angle lenses are eliminated by using multiple apertures and an intermediate image plane.

Since the four IR cameras within search and track sensor system 10 are identical to each other, so only one IR camera will be described further in details. Preferably, an IR camera includes a set of front-end optics 20, a relay optic 30, a dewar 60, a composite focal plane array 40 and an optical toggler 50.

I. Front-End Optics

Figure 2:
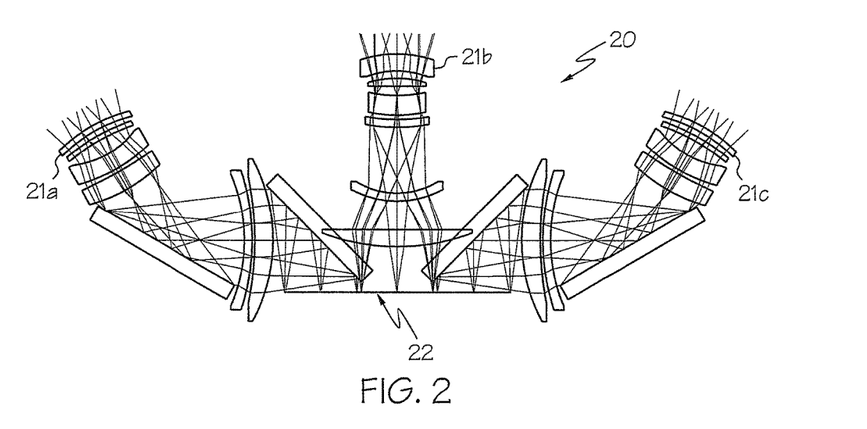
FIG. 2 is a diagram of front-end optics of a camera within the search and track sensor system from FIG. 1, in accordance with a preferred embodiment of the present invention.

With reference now to FIG. 2, there is illustrated a diagram of front-end optics 20, in accordance with a preferred embodiment of the present invention. As shown, front-end optics 20 includes a first set of lens 21a, a second set of lens 21b and a third set of lens 21c. Front-end optics 20 are preferably located within a quadrant segment of polygonal-shaped assembly 11, as depicted in FIG. 1C. Each of lens 21a, 21b and 21c is connected to a separate one of windows 15 from FIG. 1B. The images from lens 21a, lens 21b and lens 21c are subsequently combined to form a telecentric image (i.e., exit pupil located at infinity) projected on an intermediate image plane 22. Thus, front-end optics 20 can provide a 90° FOV with minimal optical distortion, wherein each of lens 21a, 21b and 21c contributes to one-third of an image to be projected on intermediate image plane 22.

Each set of lens 21a, 21b and 21c provides a 30° horizontal by 45° vertical FOV. Lens set 21b, which is located in the center among the group of three lens sets 21a-21c, includes multiple refractive elements (e.g., 6 lenses for the present embodiment) with spherical and aspherical surfaces to achieve the desired image quality. Lens materials are preferably germanium and silicon. A telecentric image is formed at intermediate image plane 22. The telecentric feature of lens sets 21a-21c facilitates the combination of front-end optics 20 with relay optics 30. Lens sets 21a and 21c are also comprised of multiple refractive elements (e.g., 6 lenses for the present embodiment) for forming the telecentric images. Lens sets 21a and 21c are specifically designed with gaps between lens groups so that two plano fold mirrors can be inserted in each of lens sets 21a and 21c to appropriately package lens sets 21a and 21c relative to center lens set 21b. Appropriate tilts on the plano fold mirrors near the images allow placement of each image adjacent to the image formed by center lens set 21b. Appropriate tilts on the plano fold mirrors in the middle of the lens sets allow the line-of-sight of each of lens sets 21a and 21c to be offset in the horizontal direction by 30° relative to the LOS of center lens set 21b. The result is a contiguous intermediate image that subtends a 90° horizontal by 45° vertical object space FOV. Table I depicts the optical prescription of lens set 21b.

II. Relay Optic

Figure 3:
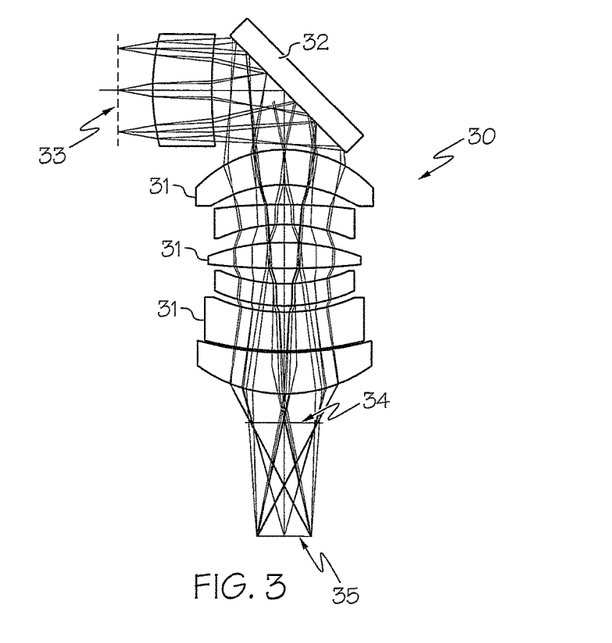
FIG. 3 is a diagram of a relay optic of a camera within the search and track sensor system from FIG. 1, in accordance with a preferred embodiment of the present invention.

Referring now to FIG. 3, there is illustrated a diagram of relay optic 30, in accordance with a preferred embodiment of the present invention. As shown, relay optic 30 includes a set of lens 31 and a mirror 32 to direct an image on an object plane 33 through an exit pupil 34 to a final image plane 35. Relay optic 30 is preferably located within a quadrant segment of cylindrical base 12, as depicted in FIG. 1C. Object plane 33 coincides with intermediate image plane 22 of front-end optics 20 such that intermediate images projected on intermediate image plane 22 can be re-imaged onto image plane 35 where the intermediate images can be extracted and processed. Exit pupil 34 is the location to be used with a cold stop.

Relay optics 30 re-image an intermediate image on intermediate image plane 22 to a final image on final image plane 35, preferably at a magnification of less than 1. This reduces the large composite image size at intermediate image plane 22 to a smaller image size at final image plane 35 within a common dewar 60. Relay optics 30 is comprised of multiple refractive elements (e.g., 7 lenses for the present embodiment) with spherical and aspherical surfaces to achieve the desired image quality. Preferably, lens materials are germanium and silicon. The design form creates a real, accessible exit pupil 34 at which a cold aperture stop is located to ensure 100% cold stop efficiency. Fold mirror 32 packages relay optics 30 into cylindrical base 12. Fold mirror 32 is also used to set the preferred LOS angle of the front optics assembly in the vertical direction relative to the horizon. Table II depicts the optical prescription of relay optics 30.

TABLE I

|  | RDY | THI | GLA |
|---|---|---|---|
| OBJ: | INFINITY | INFINITY |  |
| STO: | INFINITY | −15.093326 |  |
| 2: | INFINITY | −15.000000 |  |
| 3: | INFINITY | 15.000000 |  |
| 4: | 48.25121 | 8.578547 | SCGERMMW_SPECIAL |
| ASP: | K: 0.000000 | | |
| | A: −0.572975E−05 | B: −0.246881E−08 | C: 0.768861E−12 D: 0.183687E−14 |
| 5: | 37.78995 | 3.349686 | |
| ASP: | K: 0.000000 | | |
| | A: −0.121190E−04 | B: −0.156310E−08 | C: 0.121820E−10 D: −0.142002E−14 |
| 6: | 43.78710 | 2.000000 | SILICN_SPECIAL |
| ASP: | K: 0.000000 | | |
| | A: −0.277756E−05 | B: −0.205630E−09 | C: 0.820060E−11 D: 0.968751E−15 |
| 7: | 45.73082 | 6.815172 | |
| 8: | −47.57341 | 10.000000 | SCGERMMW_SPECIAL |
| 9: | −67.74319 | 0.508000 | |
| 10: | 345.33845 | 5.073299 | SILICN_SPECIAL |
| 11: | −111.87629 | 34.468876 | |
| 12: | −33.97178 | 3.022022 | SCGERMMW_SPECIAL |
| ASP: | K: 0.000000 | | |
| | A: −0.390504E−05 | B: 0.145431E−07 | C: 0.120383E−10 D: −0.135770E−13 |
| 13: | −43.48843 | 16.336222 | |
| ASP: | K: 0.000000 | | |
| | A: −0.258389E−05 | B: 0.109839E−07 | C: 0.254280E−11 D: −0.401429E−14 |
| 14: | −475.73092 | 6.987005 | SILICON_ SPECIAL |
| 15: | −104.60581 | 22.861169 | |
| IMG: | INFINITY | 0.000000 | |

TABLE II

|  | RDY | THI | RMD | GLA |
|---|---|---|---|---|
| OBJ: | INFINITY | 36000.000000 | | |
| STO: | INFINITY | −36000.000000 | | |
| 2: | INFINITY | 23.247205 | | |

TABLE II-continued

| | RDY | THI | RMD | GLA |
|---|---|---|---|---|
| 3: | 154.91390 | 39.019549 | | SCGERMMW_SPECIAL |
| ASP: | K: −41.012725 | | | |
| | A: −0.109424E−06 | B: 0.926804E−11 | C: −0.339309E−14 | D: 0.169457E−18 |
| 4: | 142.34835 | 46.888434 | | |
| ASP: | K: −47.855708 | | | |
| | A: −0.267564E−06 | B: 0.174059E−10 | C: −0.125734E−14 | D: 0.926114E−20 |
| 5: | INFINITY | −38.000000 | REFL | |
| | XDE: 0.000000 | YDE: 0.000000 | ZDE: 0.000000 | BEN |
| | ADE: 45.000000 | BDE: 0.000000 | CDE: 0.000000 | |
| 6: | −72.30529 | −23.018746 | | SILICN_SPECIAL |
| ASP: | K: 0.077969 | | | |
| | A: 0.318772E−06 | B: 0.431694E−11 | C: 0.155548E−13 | D: −0.139710E−17 |
| 7: | −83.20392 | −13.160695 | | |
| ASP: | K: 0.295538 | | | |
| | A: 0.164622E−06 | B: 0.126376E−10 | C: 0.400805E−14 | D: 0.174573E−16 |
| 8: | −212.26779 | −12.816317 | | SCGERMMW_SPECIAL |
| ASP: | K: −6.167962 | | | |
| | A: −0.206087E−06 | B: 0.246698E−09 | C: 0.206539E−13 | D: 0.244163E−16 |
| 9: | −90.20876 | −11.528315 | | |
| ASP: | K: −0.171103 | | | |
| | A: −0.210199E−07 | B: 0.172978E−09 | C: 0.464415E−13 | D: 0.119463E−16 |
| 10: | −157.58586 | −16.917872 | | SILICN_SPECIAL |
| ASP: | K: 4.925399 | | | |
| | A: 0.339685E−06 | B: −0.152113E−09 | C: −0.106809E−13 | D: 0.134383E−16 |
| 11: | 442.07686 | −9.637865 | | |
| 12: | 125.45843 | −14.299269 | | SCGERMMW_SPECIAL |
| ASP: | K: −3.847374 | | | |
| | A: −0.253038E−06 | B: 0.262281E−09 | C: 0.146184E−12 | D: 0.278876E−16 |
| 13: | 123.20284 | −5.165031 | | |
| ASP: | K: −4.399786 | | | |
| | A: −0.160510E−06 | B: 0.666413E−10 | C: 0.165828E−12 | D: −0.362227E−16 |
| 14: | 109.20390 | −24.081112 | | SCGERMMW_SPECIAL |
| ASP: | K: 0.000000 | | | |
| | A: 0.417835E−06 | B: 0.252690E−10 | C: −0.656407E−13 | D: 0.397320E−18 |
| 15: | 203.79120 | −1.174096 | | |
| ASP: | K: 0.020468 | | | |
| | A: 0.341230E−09 | B: 0.536537E−13 | C: −0.350401E−16 | D: −0.107161E−19 |
| 16: | 193.99111 | −26.125252 | | SILICN_SPECIAL |
| ASP: | K: −0.030710 | | | |
| | A: −0.618578E−09 | B: −0.418592E−13 | C: 0.600997E−16 | D: 0.184956E−19 |
| 17: | 98.75982 | −9.249070 | | |
| ASP: | K: 0.371598 | | | |
| | A: −0.997306E−08 | B: −0.325121E−10 | C: 0.236901E−14 | D: −0.751988E−18 |
| 18: | INFINITY | −83.820000 | | |
| | SLB: "Exit Pupil" | | | |
| IMG: | INFINITY | 0.000000 | | |

III. Composite Focal Plane Array

Figure 4A:
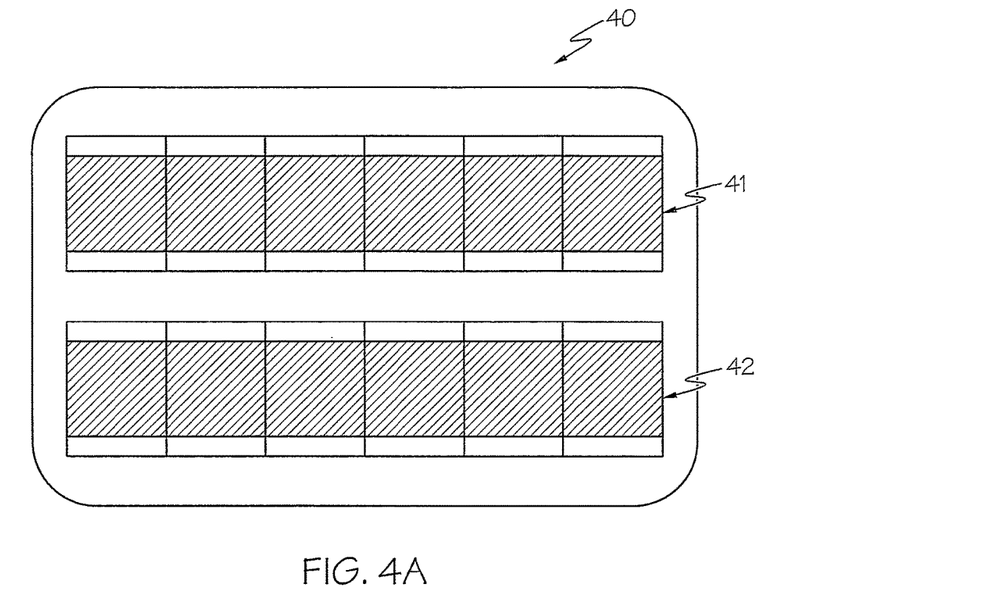
FIGS. 4A-4B are diagrams of composite focal plane arrays of a camera within the search and track sensor system from FIG. 1.

With reference now to FIG. 4, there is illustrated a diagram of composite focal plane array 40, in accordance with a preferred embodiment of the present invention. As shown, composite focal plane array 40 is made of a first strip of focal plane array (FPA) detectors 41 and a second strip of FPA detectors 42. Composite focal plane array 40 is preferably located within a quadrant segment of cylindrical base 12, as depicted in FIG. 1C. Each IR camera within a quadrant segment requires a separate dewar and cryo-cooler. But only four IR cameras are required for a 360°×60° WFOV coverage.

Image plane 35 from FIG. 3 is located on FPA detectors 41, 42 of a corresponding quadrant segment. In the present embodiment, FPA detectors 41, 42 are designed to be butt-able along two sides, enabling each linear strip of FPA detectors 41, 42 to be stacked in a 2 K×N geometry. Specifically, each of FPA detectors 41, 42 includes six 4 mega-pixel detector arrays for a total coverage of 2 K×12 K elements. The layout of FPA detectors 41, 42 is chosen based on the four-camera architecture of search and track sensor system 10 from FIG. 1.

IV. Optical Toggler

Figure 5:
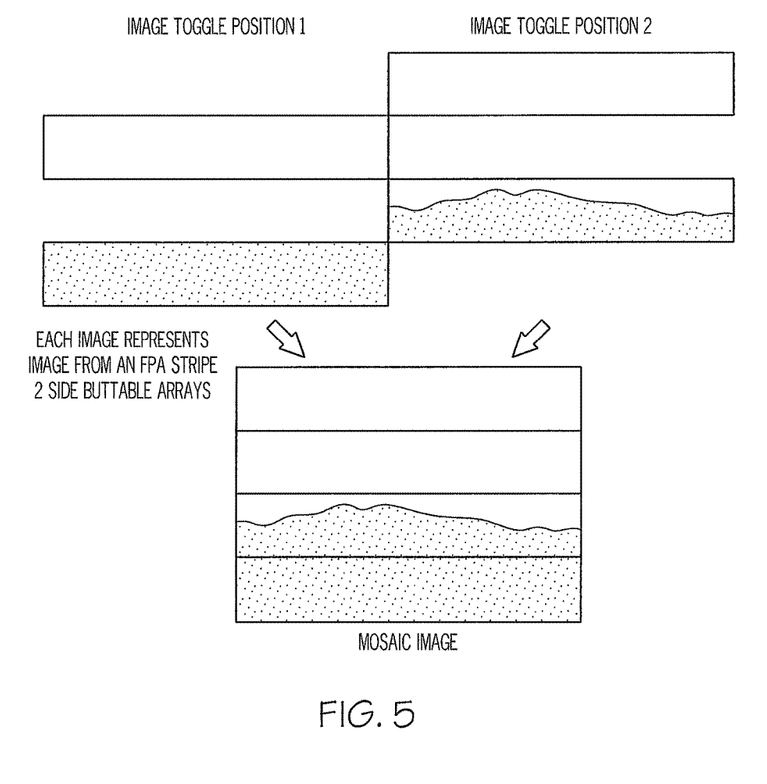
FIG. 5 illustrates a method for making mosaic-like images out of two strip of butted arrays by a toggler.

Optical toggler 50 is preferably located within a quadrant segment of polygonal-shaped assembly 11, as depicted in FIG. 1C. Optical toggler 50 switches between two discrete lines-of-sight position in order to allow two time samples to be stitched together to form a mosaic-like image, as shown in FIG. 5. Optical toggler 50 performs its function by moving two optical elements (such as front end optics 20) at a rate of 10 Hz. Within each 100 ms window, 10 ms are allocated for the imaging during which the optical elements are not moving, while the other 90 ms are used to move and then stabilize the optical elements in their proper locations. Two snapshots are used to generate the mosaic-like image, resulting in a 5 Hz update rate. Image quality is not required during the motion and stabilization period.

An in-line scanning optical design approach known as optical toggling is utilized to step a scene through two line-of-sight positions so that a contiguous composite image can be produced with a single stripe focal plane. This approach utilizes two-opposite-side butt-able sensor arrays, such as FPA detectors 41, 42 from FIG. 4, to form the strips. The details of optical toggling can be found in U.S. patent application Ser. Nos. 13/093,367 and 13/606,190, having the common assignee of the present application, the pertinent portions of which are incorporated herein by reference.

Figure 6A:
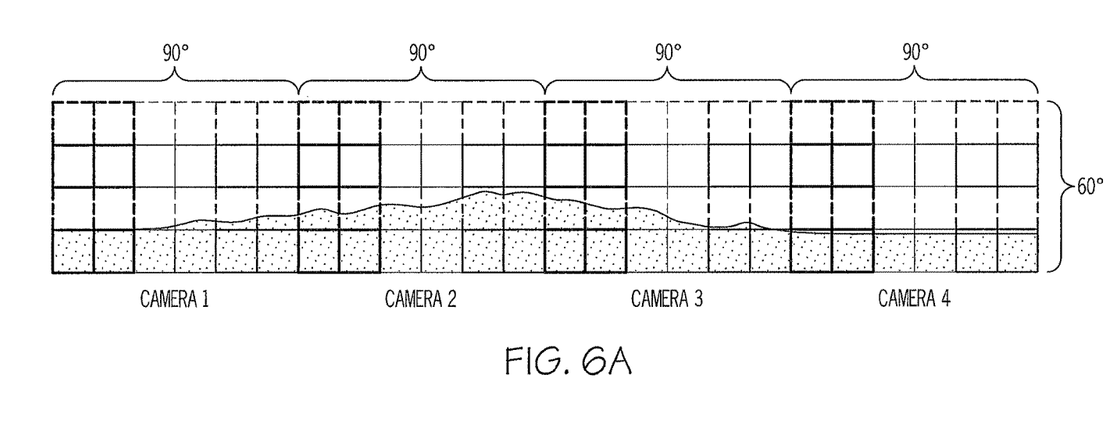
FIGS. 6A-6B illustrate the mapping of focal planes for all four cameras.
Figure 6B:
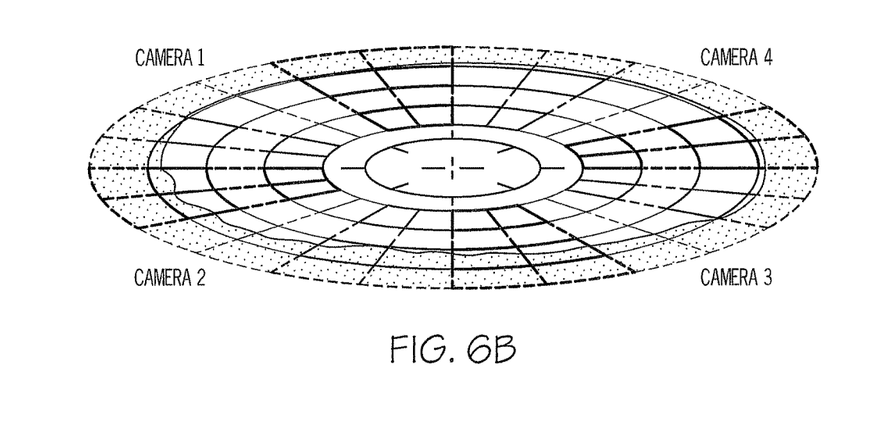

When FPA detectors 41, 42 are optically toggled in a vertical direction, they complete an image mosaic of 4×6 detector arrays, which are equivalent to nearly 100 million pixels per frame. A representation of all four IR cameras viewing an object space is shown in FIGS. 6A-6B. The solid versus dotted boxes represents the two image grabs at the two lens toggle positions.

Figure 4B:
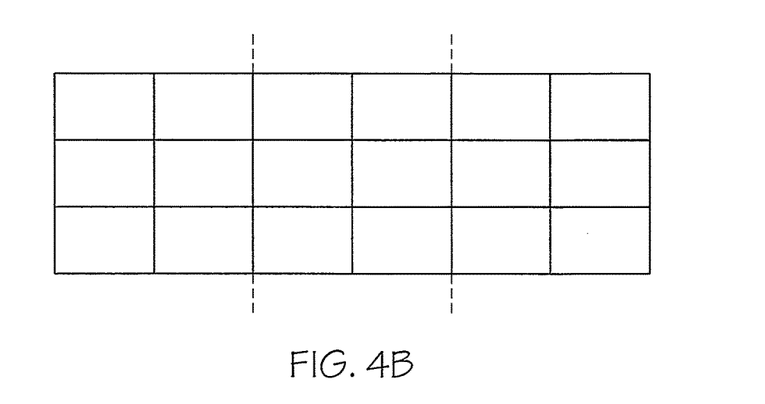

The use of two strips of detectors in composite focal plane 40 together with optical toggler 50 illustrates a means to achieve a large vertical field for view using FPA detectors that are only butt-able on two sides and have a limited number of pixels in the vertical dimension. Optical toggler 50 can be eliminated entirely if lesser vertical fields of view are required by using only a single strip of FPA detectors, such as using FPA detector 41 alone or using FPA detectors 42 alone. Alternatively, larger vertical fields of view could be achieved without optical toggling by stacking four side butt-able FPA detectors, with no gaps between strips as in FIG. 4B; thus providing simultaneous and contiguous coverage over the entire field.

As has been described, the present invention provides an improved IR search and track sensor system. Images obtained from each of three entrance apertures are merged onto a single intermediate image plane using fold mirrors. The intermediate image is then re-imaged onto a large IR focal plane. This architecture serves to minimize the number of IR detector-dewar-cooler assemblies needed to cover 360° azimuth while at the same time simplifying the lens construction and minimizing distortion.

While the invention has been particularly shown and described with reference to a preferred embodiment, it will be understood by those skilled in the art that various changes in form and detail may be made therein without departing from the spirit and scope of the invention.

What is claimed is:

1. A sensor system comprising:
an assembly having a plurality of substantially identical segments, wherein one of said segments includes
a plurality of front-end optics modules located on a same horizontal plane, each having a group of lenses, wherein images captured by said front-end optics modules are simultaneously combined to form a telecentric image projected onto an intermediate image plane within said assembly; and
a relay optic module having a mirror and a set of lenses to re-image said telecentric image located on said intermediate image plane to a final image plane; and
a plurality of focal plane array (FPA) detectors located on said final image plane to provide a composite image of various images captured by said multiple sets of front-end optics modules.

2. The sensor system of claim 1, wherein said front-end optics modules within one of said segments provide at least a 90° horizontal×60° vertical field-of-view for each of said segments.

3. The sensor system of claim 1, wherein one of said segments within said assembly includes three front-end optics modules.

4. The sensor system of claim 1, wherein one of said FPA detectors is linear.

5. The sensor system of claim 1, wherein said relay optic module is associated with two of said FPA detectors and an optical toggler for toggling images between said two FPA detectors.

6. The sensor system of claim 1, wherein said lenses within said front-end optics modules are made of germanium.

7. The sensor system of claim 1, wherein said of lenses within said front-end optics modules are made of silicon.

8. The sensor system of claim 1, wherein said relay optic module includes a dewar to provide a cooling function for said relay optic module.

9. The sensor system of claim 1, wherein said lenses within said relay optic module are made of germanium.

10. The sensor system of claim 1, wherein said lenses within said relay optic module are made of silicon.

11. The sensor system of claim 1, wherein said intermediate image plane is a planar surface.

* * * * *